US012560963B1

(12) United States Patent
Dietz et al.

(10) Patent No.: US 12,560,963 B1
(45) Date of Patent: Feb. 24, 2026

(54) WEARABLE SENSING DEVICES FOR ROBOTS

(71) Applicant: Amazon Technologies, Inc., Seattle, WA (US)

(72) Inventors: Timothy G. Dietz, Reading, MA (US); John D. Pacheco, Merrimack, NH (US); William Eugene Clem, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/899,686

(22) Filed: Sep. 27, 2024

(51) Int. Cl.
| | |
|---|---|
| *G06F 1/16* | (2006.01) |
| *G06K 7/10* | (2006.01) |
| *G06T 7/73* | (2017.01) |
| *G06V 10/94* | (2022.01) |
| *G06V 20/50* | (2022.01) |
| *G10L 25/51* | (2013.01) |
| *H04N 23/695* | (2023.01) |
| *H04N 23/90* | (2023.01) |
| *H04R 1/02* | (2006.01) |
| *G05D 1/622* | (2024.01) |
| *G05D 101/00* | (2024.01) |

(52) U.S. Cl.
CPC ......... *G06F 1/163* (2013.01); *G06K 7/10366* (2013.01); *G06T 7/73* (2017.01); *G06V 10/95* (2022.01); *G06V 20/50* (2022.01); *G10L 25/51* (2013.01); *H04N 23/695* (2023.01); *H04N 23/90* (2023.01); *H04R 1/028* (2013.01); *G05D 1/622* (2024.01); *G05D 2101/22* (2024.01); *G06T 2207/30204* (2013.01)

(58) Field of Classification Search
CPC .......... H04N 5/85; H04N 5/765; H04N 5/781; H04N 5/907; H04N 5/9261; H04N 1/00307; H04N 1/21; H04N 1/2158; H04N 19/124
USPC ......................................................... 348/159
See application file for complete search history.

(56) References Cited

U.S. PATENT DOCUMENTS

| | | | | |
|---|---|---|---|---|
| 2016/0274586 | A1* | 9/2016 | Stubbs | G06K 7/10366 |
| 2022/0414566 | A1* | 12/2022 | Napoli | G06Q 10/06311 |
| 2024/0181637 | A1* | 6/2024 | Gillett | B25J 17/00 |
| 2024/0329794 | A1* | 10/2024 | Lee | G06V 40/28 |
| 2025/0016456 | A1* | 1/2025 | Yoon | G06F 3/013 |
| 2025/0189962 | A1* | 6/2025 | Abate | G05D 1/0287 |

FOREIGN PATENT DOCUMENTS

WO      WO-2025033754 A1 *  2/2025   ......... G06F 3/04842

\* cited by examiner

*Primary Examiner* — Masum Billah
(74) *Attorney, Agent, or Firm* — Athorus, PLLC

(57) ABSTRACT

Described is a wearable device removably coupled to a host robot. The wearable device may include various sensors, output components, computing hardware, a power source, and/or communication hardware to enable the wearable device to assist the host robot in performing tasks, identifying items or tasks, determining location information, and/or performing or assisting in other tasks via possible cooperation with the host robot. The wearable device may operate at least semi-autonomously. The wearable device may be in communication with the host robot via a data connection, wirelessly, and/or via physical outputs such as emission of light, displayed content, sound, and/or haptic signals. The wearable device may also communicate with a remote server, which may also communicate with the host robot.

20 Claims, 14 Drawing Sheets

200

REMOTE SERVER 206

HOST ROBOT
DATA
210

SERVER
DATA
216

NETWORK
208

DEVICE DATA
212

WEARABLE DEVICE
204

PHYSICAL OUTPUT 214

" STOP!! "

HOST ROBOT
202

REMOTE SERVER
400

COMMUNICATION COMPONENTS
402

PROCESSOR(S)
404

MEMORY
406

LOCATION MODULE
408

HOST ROBOT MODULE
410

WEARABLE MODULE
412

COMMUNICATION MODULE
414

OPERATING STATUS PROCESS
800

DETERMINE, BY THE WEARABLE DEVICE, A TASK TO BE
PERFORMED BY HOST ROBOT
802

DETERMINE INDICIA TO OUTPUT BY THE WEARABLE DEVICE
TO COMMUNICATE THE TASK TO BE PERFORMED
804

OUTPUT, VIA THE WEARABLE DEVICE, THE INDICIA
806

WEARABLE SENSING DEVICES FOR ROBOTS

BACKGROUND

Deployment of robots is becoming increasingly common to perform repetitive tasks traditionally performed by humans. For example, robots are often used to sort and move items, perform simple tasks such as attaching parts together, and conduct other repetitive tasks. While early robots were often implemented as stationary robots with actuatable components such as arms, current robots can include features to provide semi-autonomous mobility including sensing of a location and obstacles.

Some advanced robots have been designed to be similar to humans in both size and movement. These designs enable humans and robots to work together without significant changes to a work environment to accommodate the robots and/or humans. These robots can be implemented as bipedal robots and may include two arms which makes the robots move and look like their counterpart human workers. Advances in robotics have allowed these robots to operate semi-autonomously alongside humans.

These advanced robots are often designed to perform a core set of operations (e.g., move, grasp objects, etc.). While these operations may allow the robots to successfully operate in many environments, additional items may be needed to operate these advanced robots in certain environments. Customization of these advanced robots is expensive and time consuming.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
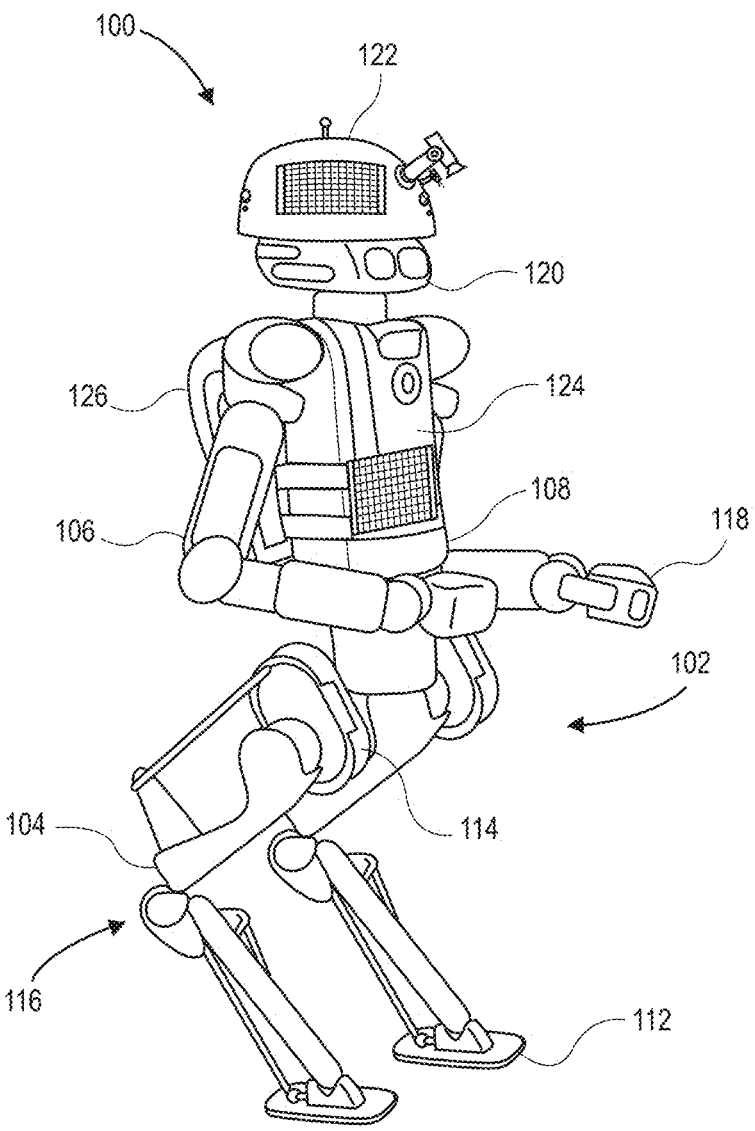
FIG. 1 is a schematic diagram of illustrative wearable devices worn by a host robot, in accordance with disclosed implementations.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

This disclosure describes wearable devices that can be worn or otherwise implemented with host robots to provide data collection and/or output information, possibly independent from operation of the host robot, while the host robot is performing operations. The host robots may be virtually any type of mobile robotic device. In some embodiments, the host robot may be a bipedal robot that includes a size and shape similar to a human while configured to at least partly mimic human movement, such as by walking, grasping objects, and the like. The wearable device may be selectively and removably coupled to a host robot. The host robot may communicate with a remote server, which may issue commands to the host robot, track the host robot, and/or exchange other information with the host robot. The wearable device, meanwhile, may also exchange information with the remote server, possibly as an intermediary to communicate with the host robot.

The wearable device may include a frame, which may be configured as a dome to simulate a head or helmet. The frame may be configured to couple to a body of the host robot and may be shaped like an article of clothing, such as a vest, jacket, or shirt. The frame may include a bag or container, such as a backpack, waist pack, shoulder sling, or other wearable accessory commonly used by humans to hold items. The wearable device may include at least a battery and a sensor powered by the battery. In some embodiments, the wearable device may include computing hardware, such as one or more processors and memory. The wearable device may also include electronic components such as communication devices (e.g., transceiver, radio, near field communication device, wideband communication device, Bluetooth® receiver, etc.), light components (e.g., display screen, display lights, projector, laser pointer, etc.), one or more microphone, a speaker, imaging devices (e.g., cameras, thermal sensors, etc.), and/or actuation devices to move or position one or more components.

While the wearable device may be configured to perform many different operations independent of the host robot, and possibly some operations in coordination with the host robot, some illustrative operations are described below.

Illustrative use case I: The wearable device may assist in detection of humans within a threshold range of the host robot. The wearable device may include a sensor to detect a presence of a human within a predetermined distance. In some embodiments, the sensor may be a radio receiver configured to receive a unique radio signal emitted by a device worn by humans. In various embodiments, the sensor may be an imaging device configured to capture imagery of the environment. The wearable device may then process the imagery using image analysis software to detect the presence of a human. The wearable device may include one or more microphones to capture sounds emitted by humans or by devices worn by humans. After capturing data and processing the data to determine a presence of a human within a threshold distance of the host robot wearing the wearable device, the wearable device may communicate the detected presence of the human to the host robot, a remote server, and/or to the human providing confirmation to the human of the detection. The communication may be performed using radio signals and/or by outputting physically perceivable information, such as an audible sound, light, a vibration, or other physically perceivable information that can be sensed by sensors of the host robot. Used in this way, the wearable device may provide redundancy to systems implemented by the host robot to detect human presence near a host robot.

Illustrative use case II: The wearable device may include a sensor to determine a location of the wearable device (and thus the host robot) within an operating environment. The operating environment may include fiducial marks or other location attributes to enable the wearable device to determine a specific location within the operating environment. In some embodiments, the wearable device may include an imaging device to capture imagery of the operating environment proximate to the wearable device. The wearable device may then process the imagery to determine a specific location within the operating environment. The wearable device may send the location to a remote server and/or provide the location information to the host robot, such as via a data port, wireless-transported data, an audible message, or other communication protocol established with the host robot. In some embodiments, the wearable device may capture location information from radio signals emitted from the operating environment, tactile information in the operating environment, or capture other physically perceivable information from within the operating environment. This information may be processed by the wearable device to determine a specific location in the operating environment and may then be communicated to the remote server and/or the host robot.

Illustrative use case III: The wearable device may include a sensor to detect items in an environment, which may be identified by the wearable device and associated with a location. The wearable device may determine whether a current location of the detected item is a proper location for the detected item or whether the detected item is misplaced. For example, from time to time, some items may be dropped or otherwise misplaced within the operating environment. The wearable device may use a camera and object recognition software to identify objects and may determine whether the items are misplaced. When the wearable device detects a misplaced item, the wearable device may provide a signal to the remote server and/or the host robot to initiate retrieval of the misplaced item. In some embodiments, the wearable device may communicate at least some information to the host robot to enable the host robot to identify a misplaced item, retrieve the misplaced item, and determine a location to deposit the misplaced item.

The wearable device may provide other benefits to the host robot in addition to the user cases provided above. For example, the wearable device may locate robots needing assistance and may determine how to assist those robots, such as by providing coordinated help with the host robot. As another example, the wearable device may determine items to be processed by the host robot and may locate those items in the environment and possibly provide indicators to the host robot about the location of the items, such as by projecting light on an item to be manipulated by the host robot.

Further details about the components of the wearable device, the design of the wearable device, and the operation of the wearable device are discussed in greater detail with reference to FIGS. 1-14.

FIG. 1 is a schematic diagram of illustrative wearable devices 100 worn by a host robot 102, in accordance with disclosed implementations. The host robot may be a bipedal robot that includes two legs 104 and two arms 106, each being connected to a body 108 (e.g., torso) of the host robot 102. The legs 104 may include feet 112 coupled to hips 114 by a plurality of joints. In some implementations, a knee joint 116 may face in the opposite direction of a human knee joint such that the knee joint 116 is located behind the host robot 102 when the knee joint reduces an angle between coupled structures to lower the host robot or take a step. The arms 106 may include end effectors 118 which may operate like pinchers or hands to grasp items, move items, and release items. In some embodiments, the host robot 102 may include a head 120 that may include sensors or visual indicia of eyes and other human like features to simulate features on a human head. The head 120 may be fixed in orientation related to the body 108 of the host robot 102. Thus, unlike a human, the head 120 of the host robot 102 may not rotate or move independent of the body 108, such as by rotating relative to the body 108 or angling away from or toward the body 108 such as to simulate a nod.

The wearable devices 100 may include a dome 122 configured to couple to a top of the host robot such as on the head 120 of the host robot 102 or above the body 108 of the host robot 102. The dome 122 may create an appearance of some features of a human head or a helmet. The dome 122 may be removably coupled to the host robot at a location above the body 108 or on the head 120 of the host robot 102 if the host robot 102 includes the head 120. The dome 122 may be couped to the host robot 102 by one or more straps, with adhesive, by magnets, with fasteners, or with any other coupling devices that can be removed relatively quickly and without damaging the host robot 102. The dome 122 may be designed to be relatively light in weight to avoid disrupting the balance or center of gravity of the host robot 102. The dome 122 may include apertures to avoid blocking or otherwise inhibiting functions of sensors of the host robot 102, such as any sensors included in the head 120 of the host robot 102. The dome 122 may be formed of a plastic, composite, or metal material, although other materials may be used. The dome 122 may act as a frame to secure sensors or other electronic components, such as one or more imaging devices, microphone(s), speaker(s), light component(s), and/ or other components.

The wearable devices 100 may include a vest 124 configured to removably couple to the body 108 of the host robot 102. The vest 124 may be designed as a garment-like wearable that can be worn over the body 108 of the host robot 102. The vest 124 may include a frame formed of a fabric such as nylon, although other materials may be used. The material may conform to the shape of the body 108 but may be a substantially or partly rigid material or pliable material such as a plastic or composite. The vest 124 may be designed to avoid interference with moving parts of the host robot 102 and any sensors included in the host robot 102, such as by including cutouts, apertures, or other designs to allow the host robot 102 to function as if the vest 124 were not worn by the host robot 102. The vest 124 may be coupled to the host robot 102 by one or more straps, with adhesive, by magnets, with fasteners, or with any other coupling devices that can be removed relatively quickly and without damaging the host robot 102. The vest 124 may be designed to be relatively light in weight to avoid disrupting the balance or center of gravity of the host robot 102. The vest 124 may act as a frame to secure sensors or other electronic components, such as one or more imaging devices, microphone(s), speaker(s), light component(s), and/or other components.

The wearable devices 100 may include a storage receptacle 126, such as a backpack, a waist pack, a sling pack, a front pack, or other wearable container or bag that can removably couple to the host robot 102. The storage receptacle 126 may be connected to the vest 124 and/or to the dome 124 and may include ports that connect to the dome 122 and/or the vest 124. The storage receptacle 126 may be used to transport a battery, computing hardware (e.g., processors and memory) and possibly communication devices, which do not require a line of sight to/from the operating environment as required by a display or an imaging device, for example.

The dome 122, the vest 124, and/or the storage receptacle may be implemented for use with the host robot 102 depending on a sensor configuration and output components desired for the wearable devices 100. As discussed below with reference to at least FIGS. 3-7B, the dome 122 and the vest 124 may include sensors and other components to perform functions described with reference to at least FIGS. 8-14.

Figure 2:
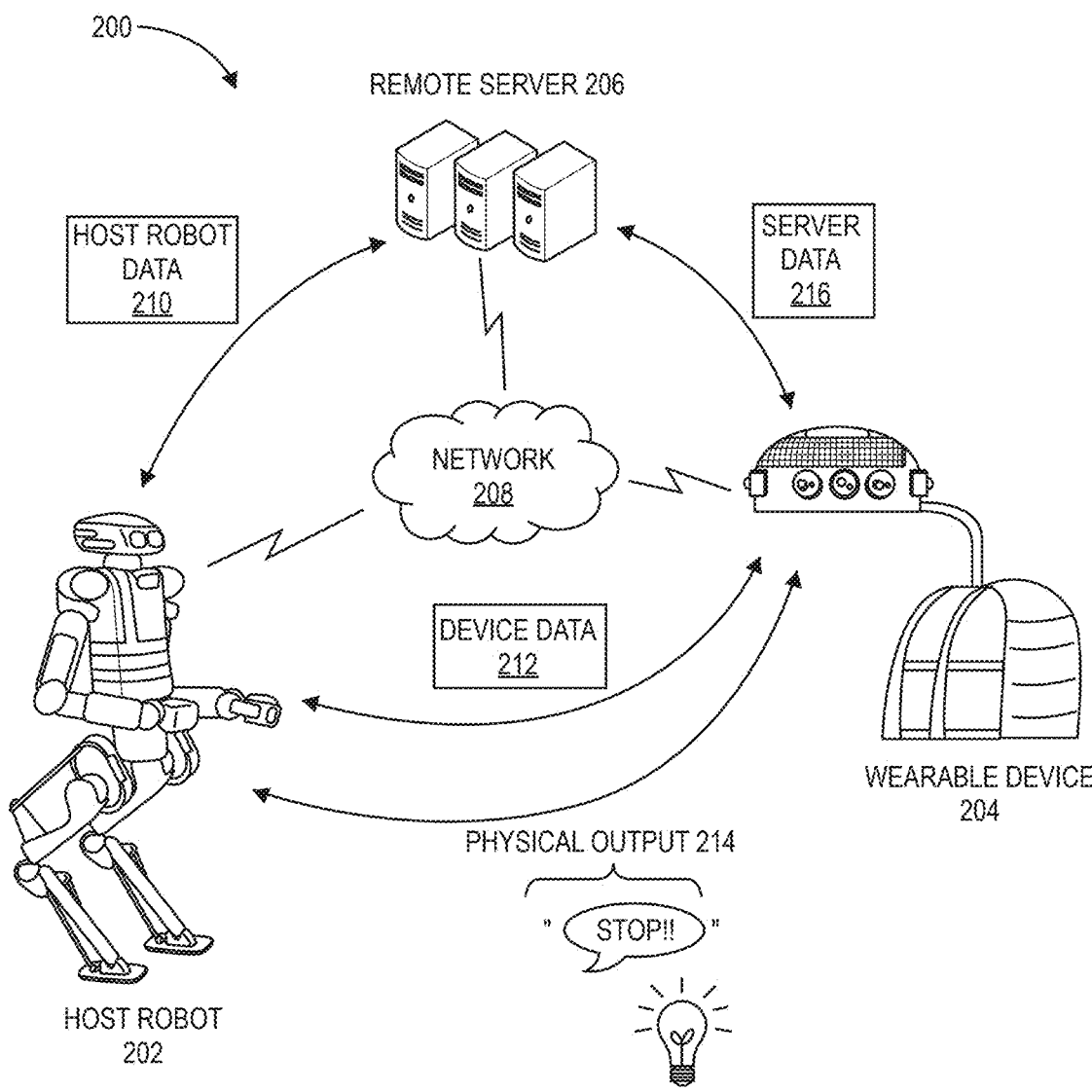
FIG. 2 is a schematic diagram of an illustrative environment that includes a host robot, a wearable device, and a remote server in communication with the host robot and wearable device, according to an implementation.

FIG. 2 is a schematic diagram of an illustrative environment 200 that includes the host robot 202, a wearable device 204, and a remote server 206, according to an implementation. The host robot 202 may be implemented as a mobile robot such as the host robot 102 described with reference to FIG. 1. The wearable device 204 may include a dome, a vest, and/or a storage receptacle (e.g., a pack). The wearable device 204 may be any combination of the wearable devices 100 described with reference to FIG. 1. The remote server 206 may be implemented as computing resources to communicate with the host robot, the wearable device, or both, via one or more network(s) 208. The network(s) 208 may include wireless and/or wired networks, and may be wide area networks, local networks, mobile networks, or any other type of networks that facilitate secure and/or possibly unsecure exchange of data. The network(s) 208 may enable exchange of data between any of the devices shown in the environment 200.

The remote server 206 may exchange host robot data 210 with the host robot 202. The host robot data 210 may include tasks to be performed, location information, environmental information, item information, and/or other information to enable the host robot to perform a task. The host robot 202 may send host robot data 210 to the remote server 206, such as location data, task updates, status updates, data inquires, and/or other data. The host robot 202 may operate autonomously from time to time without exchanging data 210 with the remote server 206.

The wearable device 204 may be coupled to and uncoupled from (or worn by) the host robot 202 as shown in FIG. 1. The wearable device 204 may exchange device data 212 with the host robot 202, such as via the network(s) 208. The device data 212 may be exchanged via one or more port connections between the wearable device 204 and the host robot 202. The device data 212 may be exchanged wirelessly between the wearable device 204 and the host robot 202, such as via a Bluetooth® connection or other wireless protocol. The device data 212 may include location information, task information, item information, imagery, and/or other data generated by either the wearable device 204 or the host robot 202.

The wearable device 204 and the host robot 202 may communicate information through physical output(s) 214, such as movement, visual displays, audible sounds, tactile outputs (e.g., vibration, tapping, etc.), and other physically perceivable outputs. For example, the wearable device 204 may detect a human within a threshold distance from the host robot 202 and may cause a speaker in the wearable device 204 to emit sounds, such as "stop" or "slow," which may be detected by a microphone included in the host robot 202. As another example, the wearable device 204 may identify an object to be moved by the host robot 202. The wearable device 204 may cause a projector of the wearable device 204 to emit light on the object, which may be detected by an image sensor of the host robot 202. In this way, the wearable device 204 may communicate to the host robot 202 which object to select for a task. Of course, the wearable device 204 may provide other outputs to the host robot 202 to communicate task information, item information, environment information, and/or other information. Similarly, the host robot 202 may provide physical communications (not using the network(s) 208) to the wearable device 204, such as by emitting light signals or displays, emitting sound, providing tactile outputs, and the like.

In some embodiments, the wearable device 204 and the host robot 202 may communicate through the remote server 206 that acts as an intermediary. The wearable device 204 may exchange server data 216 with the remote server 206. The server data 216 may be any data generated by the wearable device 204 for the remote server 206 (or possibly to be passed to the host robot 202). The server data 216 may be any data generated by the remote server 206 for the wearable device 204. For example, the wearable device 204 may determine location information and may provide the location information, as the server data 216, to the remote server 206 to enable tracking of the wearable device 204 and/or the host robot 202. The remote server 206 may provide task information, as the server data 216, to the wearable device, such as a request to identify objects near the host robot 202, among many other possible tasks that the wearable device 204 can perform.

In some embodiments, the host robot 202 may be assigned a task to perform by the remote server 206. The wearable device 204 may detect the task based on actions observed from the host robot 202 and/or receive information about the task from the remote server 206. The wearable device 204 may assist the host robot 202 during performance of the task, such as by monitoring the operational environment for obstacles (e.g., humans, cliff detection, etc.), identifying objects, providing location information, and/or performing other operations. Location information may be obtained from location attributes, fiducials, which may be unique location indicia located on a surface within the operating environment, and/or from other information in an environment. For example, the operating environment may include fiducials arranged in a grid or other known pattern on a floor in the operating environment. The host robot 202 and/or the wearable device 204 may identify the fiducials using imaging devices to determine a current location of the host robot 202. Location attributes may include imagery, shapes, and/or other detectable information in the environment that is associated with a known location. For example, a view of a hallway, presence of particular windows and doors, and other physical features in known locations may provide information to enable determination of a known location of the wearable device in an environment.

Figure 3:
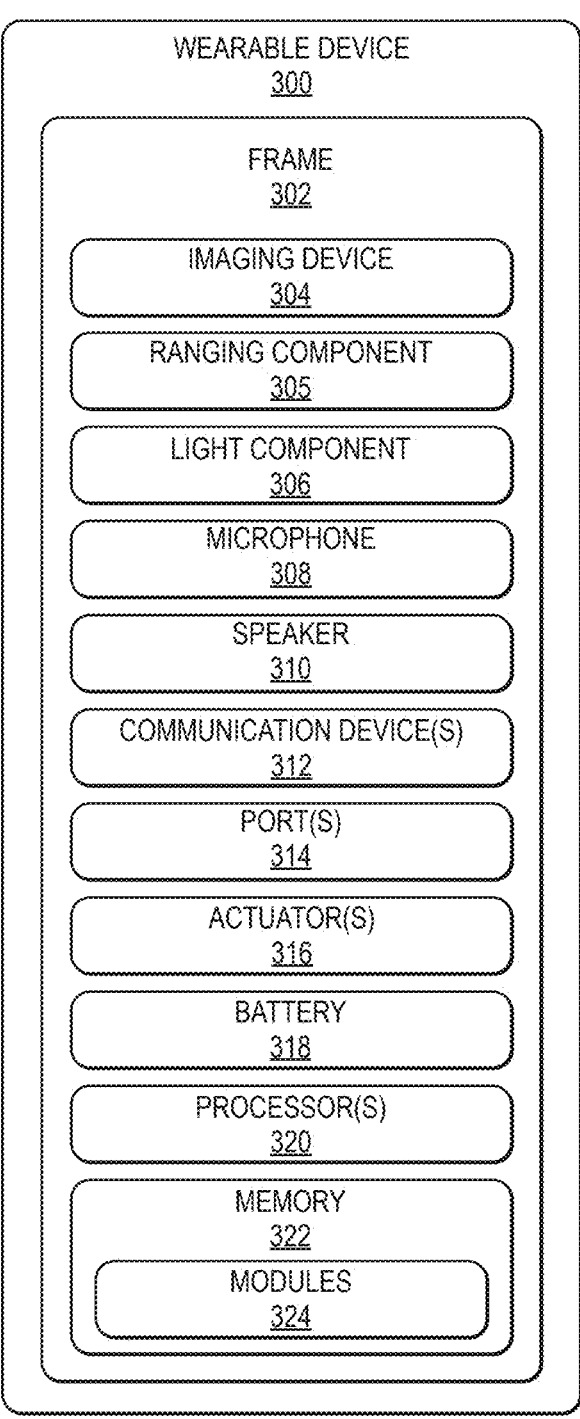
FIG. 3 is a block diagram of example software architecture including illustrative components of a wearable device, according to an implementation.

FIG. 3 is a block diagram of example software architecture including illustrative components of a wearable device 300, according to an implementation. The wearable device 300 may include any features of the wearable devices 100 and the wearable device 204 described with reference to FIGS. 1 and 2, respectively.

The wearable device 300 may include a frame 302. The frame 302 may couple to the various components included in the wearable device 300, thereby securing the components together. The frame 302 may also removably couple to the host robot, such as via straps, magnetic force, fasteners, adhesive, and/or other coupling means. The frame 302 may be formed of a material, such as nylon, rubber, plastic, and/or other pliable materials. In some embodiments, the frame 302 may include rigid structure, such as when the wearable device is formed as a dome.

The wearable device 300 may include one or more imaging devices 304 coupled to the frame 302. The imaging device(s) 304 may include cameras, thermal imaging devices, or other imaging devices capable of producing visual data of a surrounding environment. The imaging devices may be located in different parts of the frame to capture imagery from the wearable device 300 when coupled to the host robot.

The wearable device may include a ranging component 305 coupled to the frame 302. The ranging component may include any component capable of determining distances and possibly to construct three dimensional (3D) surfaces, such as light detection and ranging (Lidar), ultrasound, thermal imaging, radio detection and ranging (Radar), including mmRadar. The ranging component 305 may be used to determine distances to objects, create 3D surfaces of objects in the environment, detect cliffs (e.g., a change in elevation on a floor, such as due to presence of a loading dock, stairs, etc.), and/or provide other navigational or location information.

The wearable device 300 may include one or more light component(s) 306 coupled to the frame 302. The light component(s) 306 may include liquid crystal displays (LCDs), light emitting diodes (LEDs), projectors, laser pointers, pixelated grids of lights, and/or other lights to create visual output for humans, the host robot, or other devices. The light component 306 may provide light to indicate objects for selection by the host robot, to illuminate part of the operating environment absent other light sources (e.g., in the dark), and for other reasons.

The wearable device 300 may include one or more microphone(s) 308 coupled to the frame 302. The microphones 308 may capture sound from the operating environment. The microphones may be arranged in a microphone array to determine directionality of sound or location of a source of sound, such as by triangulating sound received by the microphone array.

The wearable device 300 may include one or more speaker(s) 310 coupled to the frame 302. The speakers 310 may emit sounds from the wearable device 300, which may be used to communicate information to humans, to the host robot, and/or to other robots in the operating environment.

The wearable device 300 may include one or more communication device(s) 312 coupled to the frame 302. The communication device(s) 312 may include radios to communicate with a network, such as the network(s) 208 shown in FIG. 2. The communication device(s) 312 may include one or more different communication types, such as transceivers, receivers, and/or transmitters to communicate with the remote server 206 (shown in FIG. 2), the host robot 202 (shown in FIG. 2), and/or to detect radio badges worn by humans in the operating environment. The communication types may include Wi-Fi, Bluetooth, ultrawide band communications, near field communications, and communications using other protocols. The communication device(s) 312 may include global positioning system (GPS) receivers and/or other locating devices that rely on transmission of radio signals.

The wearable device 300 may include one or more port(s) 314 coupled to the frame 302. The port(s) may enable the wearable device to share data and/or power with the host robot. For example, the port 314 may enable exchange of the device data 212 shown in FIG. 2. As another example, the port 314 may enable the wearable device to draw power from a battery of the host robot.

The wearable device 300 may include one or more actuator(s) 316 coupled to the frame 302. The actuators 316 may be coupled to other components of the wearable device 300 described with reference to FIG. 3 to enable movement and/or repositioning of select components. For example, the actuator 316 may be coupled between the frame 302 and an imaging device 304 to enable tilting of the imaging device, zooming of a lens of the imaging device, or other movements of the imaging device 304 such as to change a field of view of the imaging device. The actuator 316 may be coupled between parts of the frame 302 to enable rotation of the frame 302 or other movements of the frame 302 or portion thereof. For example, when the frame 302 is formed as a dome, one or more actuators 316 may cause rotation of the dome with respect to coupling structures coupled to the host robot to cause the dome to rotate relative to the body or head of the host robot. This may simulate rotation of a head, for example or be used to position an imaging device toward an object or part of the operating environment.

The wearable device 300 may include a battery 318 coupled to the frame 302. The battery 318 may include various battery cells that may be coupled to the frame in different locations. The battery 318 may be coupled to a wearable pack, such as a backpack or waist pack that couples to the body of the host robot.

The wearable device 300 may include one or more processor(s) 320 coupled to the frame 302 and to the various components described above with reference to the wearable device 300, such as the imaging device(s) 304, the light component(s) 306, the microphone 308, the speaker 310, the communication device(s) 312, the actuators 316, and the battery 318. The processors may execute instructions stored in memory 322. The instructions may be stored in modules 324 to cause the wearable device to perform certain operations, such as operations described below with respect to FIGS. 8-14, among other possible operations.

Figure 4:
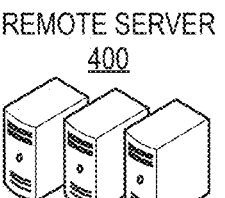
FIG. 4 is a block diagram of example software architecture including illustrative components of a remote server, according to an implementation.

FIG. 4 is a block diagram of example software architecture including illustrative components of a remote server 400, according to an implementation. The remote server 400 may be similar to the remote server 206 described with reference to FIG. 2. The remote sever 400 may be implemented in a virtual environment using distributed computing (e.g., cloud computing), as a contained server (e.g., edge device), as conventional servers, or using other implementations and hardware known in the art for providing computing resources to exchange data with many remote robotic devices distributed across one or more operating environments. The operating environment may be a warehouse, a manufacturing location, a customer service center (e.g., retail location, service location, etc.), or other location where robots can perform repetitive tasks possibly alongside humans.

The remote server 400 may include communication components 402 to communicate with the host robot, the wearable device, or both via the network(s) 208 shown in FIG. 2. The communication components 402 may include one or more different communication devices, such as transceivers, receivers, and/or transmitters to communicate with the host robot 202 (shown in FIG. 2), the wearable device 204 (shown in FIG. 2), and/or other devices in the operating environment. The communication types may include Wi-Fi, Bluetooth, ultrawide band communications, near field communications, and communications using other protocols.

The remote server 400 may include one or more processor(s) 404. The processor(s) 404 may execute instructions stored in memory 406. The instructions may be stored in various modules. The memory 406 may store a location module 408 executable by the processors 404 to track location of host robots, humans, the wearable devices, and/or other devices or items located in an operating environment. The location module 408 may maintain certain spacing between robots and humans, such as using the wearable device to determine locations of the host robot and humans and then controlling the host robots accordingly to maintain a threshold distance from humans and/or slowing operational speed of the host robot when within a threshold range of a human. The location module 408 may receive location information from the wearable device, such as information obtained from fiducial marks or other location attributes that is transmitted from the wearable device to the remote server 400.

The memory 406 may store a host robot module 410 executable by the processors 404 to interact with the host robot. For example, the host robot module 410 may provide location information to the host robot, possibly relayed from the wearable device. The host robot module 410 may provide task information to the host robot, such as tasks to be performed, instructions for performing those tasks, and so forth. The host robot module 410 may provide information to host robots about locations of humans, such as information from the location module 408. The host robot module 410 may exchange other information with the host robot to enable the host robot to perform tasks, monitor operation of the host robot, and the like.

The memory 406 may store a wearable module 412 executable by the processors 404 to exchange data with the wearable device, such as data including tasks performed by the host robot, item or object information such as to identify objects, and/or information on tasks to be performed by the wearable device. For example, the wearable module 412 may instruct the wearable device to identify a certain object and emit light on the identified object so that the host robot can retrieve the object. As another example, the wearable device may transmit an image of an item in a field of view of an imaging device of the wearable device. Wearable module 412 may provide information about the object such as to positively identify the object, to determine if the object is misplaced, or for other reasons. The wearable module 412 may assist the wearable device to perform at least some operations described with reference to FIGS. 8-14.

The memory 406 may store a communication module 414 executable by the processors 404 to communicate with the wearable device and/or the host device. The communication module 414 may transmit and/or receive information from the communication components 402 and may route the information to a corresponding or destination module, such as one of the modules stored in the memory 406.

Figure 5:
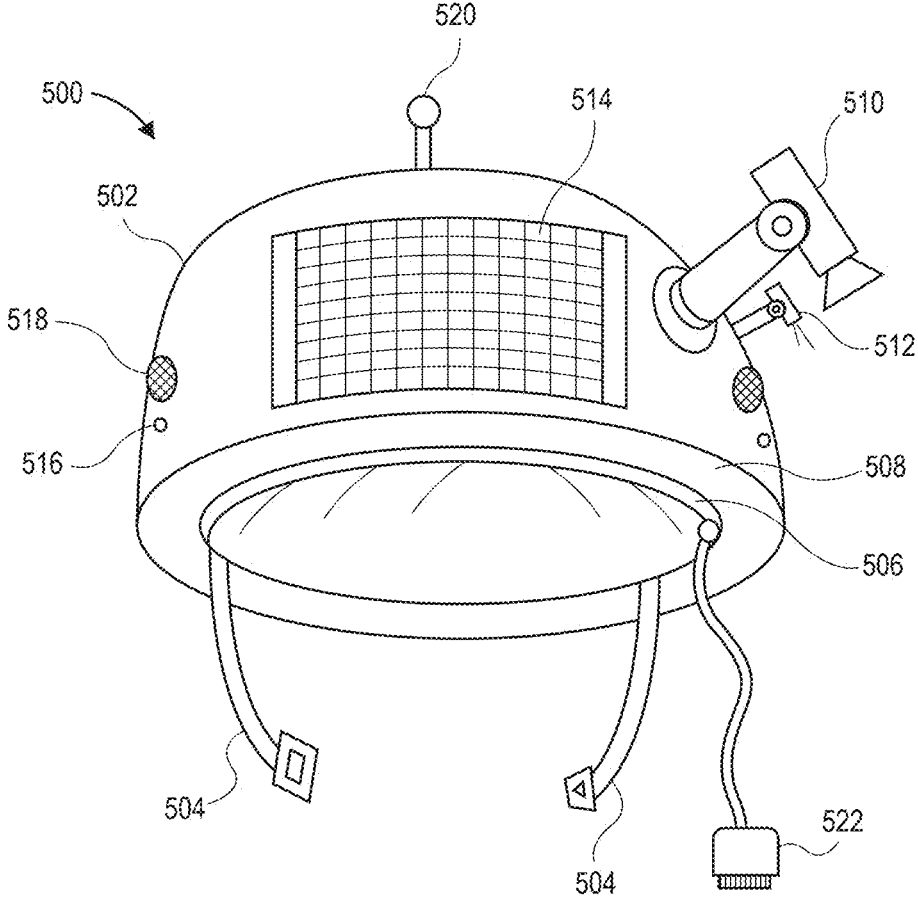
FIG. 5 is a schematic diagram of an illustrative wearable device configured as a dome, in accordance with an implementation.

FIG. 5 is a schematic diagram of an illustrative wearable device 500 configured as a dome 502, in accordance with an implementation. As discussed with reference to FIG. 1, the wearable devices 100 may include a frame or structure shaped as the dome 122, which may be similar to the dome 502. The dome 502 may be configured to couple to a top of the host robot such as on a head of the host robot or above the body of the host robot. The dome 502 may be formed to simulate an appearance of a head or a helmet. The dome 502 may be removably coupled to the host robot at a location above the body or on the head of the host robot if the host robot includes the head and may be uncoupled from time to time, such as to perform maintenance on the wearable device or move the wearable device to another host robot. The dome 502 may be couped by one or more straps 504, with adhesive, by magnets, with fasteners, or with any other coupling devices that can be removed relatively quickly and without damaging the host robot. The dome 502 may act as a frame to secure sensors or other electronic components, such as one or more imaging devices, microphone(s), speaker(s), light component(s), and/or other components.

As shown in FIG. 5, the dome 502 may include a first component 506 to couple to the host robot and a second component 508 that can rotate about the first component 506. For example, the first component 506 may be a small dome located adjacent and partially within a larger dome that forms the second component 508. The rotation may be provided by an actuator, such as the actuator 316 discussed with reference to FIG. 3, possibly implemented by a motor that rotates the second component 508 relative to the first component 506. Rotation of the second component 508 may enable simulation of a head turning about a neck. Thus, the wearable device 500 may cause the second component 508 to rotate and face a particular direction, such as a direction of an object, a direction of a human, a direction of intended travel, a direction that the robot is simulating looking toward, and so forth. The rotation may be to position a field of view of an imaging device 510 coupled to the second component toward a certain part of an operating environment. The rotation may be to point a light projector 512 (e.g., a laser pointer, a light emitter, flashlight, a pico projector, etc.) coupled to the second component in a certain direction to illuminate an object or a part of the operating environment. The light projector 512 and/or the imaging device 510 may include actuators to adjust tilt, zoom, focus, or other attributes of the respective devices. In some embodiments, the wearable device 500 may include multiple imaging devices and/or multiple projectors.

The wearable device 500 may include a light component 514. The light component 514 may be an LCD, a grid of lights, such as LEDs, or another arrangement of controllable lights that, when activated, can provide information or imagery to other devices or humans or direct light toward a portion of the environment. In some embodiments, the light component may wrap partway or all the way around a perimeter of the dome 502. The light component 514 may output light of difference colors and brightness. The light component 514 may emit light to simulate eyes of the host robot, create words (possibly scrolling) to provide a message, to provide an alert or warning (such as to indicate detection or presence of a human), and/or for other reasons.

The wearable device 500 may include one or more microphone 516 and speakers 518 to capture audio and emit sound. The wearable device 500 may include an antenna 520 in connection with one or more of the communication devices to transmit and/or receive radio signals. The wearable device 500 may include a port 522. The port 522 may enable transfer of power and/or data with the host robot or another part of the wearable device, such as a vest or pack (e.g., backpack, waist pack, etc.). For example, some components of the wearable device 500 such as computing hardware (e.g., processors, memory, and/or battery) may be connected to via the port 522 and may be located in a different wearable device. However, the computing hardware (e.g., processors, memory, and/or battery) may be included in the wearable device 500, such as coupled to an interior of the second component 508 of the dome 502.

Figure 6:
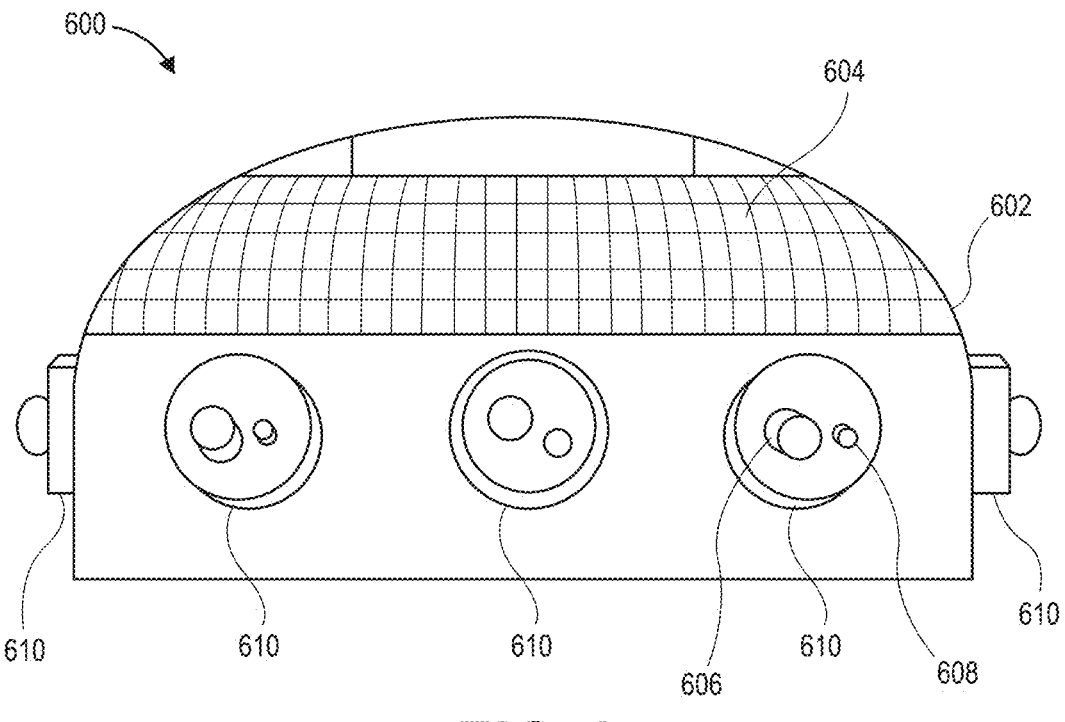
FIG. 6 is a schematic diagram of another illustrative wearable device configured as a dome, in accordance with an implementation.

FIG. 6 is a schematic diagram of another illustrative wearable device 600 configured as a dome 602, in accordance with an implementation. The dome 602 may be shaped similar to the dome 502 and may couple to the host robot using similar features as the dome 502. The dome 602 may include an appearance of a head or a helmet. The dome 602 may act as a frame to secure sensors or other electronic components, such as one or more imaging devices, microphone(s), speaker(s), light component(s), and/or other components.

As shown in FIG. 6, the wearable device 600 may include a light component 604. The light component 604 may be an LCD, a grid of lights, such as LEDs, or another arrangement of controllable lights that, when activated, can provide information or imagery to other devices or humans or direct light toward a portion of the environment. In some embodiments, the light component may wrap partway or all the way around a perimeter of the dome 602. The light component 604 may output light of difference colors and brightness. The light component 604 may emit light to simulate eyes of the host robot, create words (possibly scrolling) to provide a message, to provide an alert or warning (such as to indicate detection or presence of a human), and/or for other reasons. The light component 604 may emit light to simulate rotation of the dome 602, such as by emitting a display of eyes that scroll across the light component 604 to create an illusion or visual effect to simulate rotation of the head of the robot, for example. The scrolling of displayed content (e.g., eyes, etc.) may be synchronized with the actual movement of the host robot. However, the scrolling displayed content may be based on other information or movement, such as detection of a human. For example, when a human is detected, the light component may emit a display to simulate eyes looking toward the human to indicate to the human that the host robot has detected the human's presence and general location. The light component 604 may be used to provide other information, including text (possibly scrolling) and/or other information to humans, other robots, and/or the host robot.

The wearable device 600 may include a plurality of imaging sensors 606 and/or light projectors 608, which may be included as a pair or collection in a pod 610. The imaging sensors 606, light projectors 608, and/or pods 610 may be located around a perimeter of the dome 602, such as to monitor different directions or portions of an operating environment. The location of the components may enable overlap of light emission and/or field of view of image capture. Unlike the wearable device 500 shown in FIG. 5, the wearable device 600 may not physically rotate. Therefore, the location of the components about a perimeter of the dome 602 may enable capture of imagery, emission of light, capture of sound, or emission of sound at most or nearly all angles or directions.

The wearable device 600 may include one or more microphone and speakers to capture audio and emit sound. The wearable device 600 may include an antenna in connection with one or more of the communication devices to transmit and/or receive radio signals. The wearable device 600 may include a port. The port may enable transfer of power and/or data with the host robot or another part of the wearable device, such as a vest or pack (e.g., backpack, waist pack, etc.). For example, some components of the wearable device 600 such as computing hardware (e.g., processors, memory, and/or battery) may be connected to via the port and may be located in a different wearable device. However, the computing hardware (e.g., processors, memory, and/or battery) may be included in the wearable device 600, such as coupled to the dome 602.

Figure 7A:
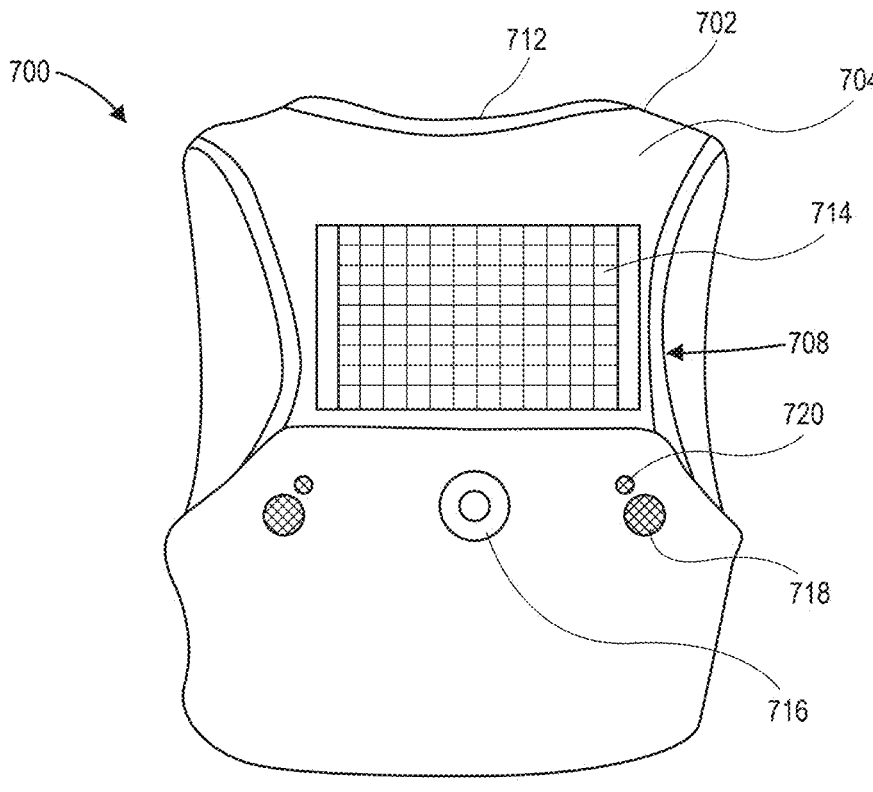
FIGS. 7A and 7B are schematic diagrams of yet another illustrative wearable device configured as a vest, in accordance with an implementation.
Figure 7B:
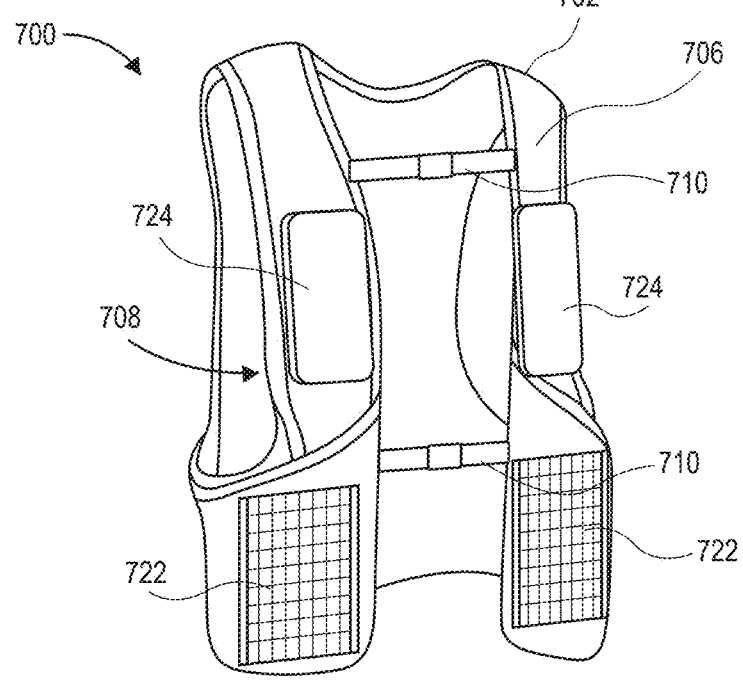

FIGS. 7A and 7B are schematic diagrams of yet another illustrative wearable device 700 configured as a vest 702, in accordance with an implementation. FIG. 7A shows a front side 704 of the vest 702 while FIG. 7B shows a back side 706 of the vest 702. The vest 702 may include similar components to the domes 502 and 602 described with reference to FIGS. 5 and 6, respectively. The vest 702 may be a high visibility vest to assist in visual detection of the host robot, such as by including reflective material and/or having bright colors (e.g., bright yellow).

The vest 702 may be configured to removably couple to the body of the host robot, and thus "worn" by the host robot, while being configured to uncouple and be removable from the host robot. The vest 702 may be designed as a garment-like wearable that can be worn over the body. The vest 702 may be formed of a fabric such as nylon, although other materials may be used. The material may conform to a general shape of the body or torso of the host robot but may be formed of a substantially or partly rigid material or pliable material such as a plastic or composite. The vest 702 may be designed to avoid interference with moving parts of the host robot and any sensors included in the host robot, such as by including apertures 708 for arms of the host robot, other apertures, or other designs to allow the host robot to function as if the vest 702 were not worn by the host robot. The vest 702 may be couped by one or more straps 710, with adhesive, by magnets, with fasteners, and/or with any other coupling devices that can be removed and without damaging the host robot. The vest 702 may be designed to be relatively light in weight to avoid disrupting the balance or center of gravity of the host robot. The vest 702 may act as a frame to secure sensors or other electronic components, such as one or more imaging devices, microphone(s), speaker(s), light component(s), and/or other components. Example placement of some of these components is described next with reference to FIGS. 7A and 7B. However, other placements may be used for the components depending on the operations of the components, design of the host robot, and/or other factors.

Turning to FIG. 7A, the front side 704 of the vest 702 may include a cutout 712 for a neck of the host robot, which may be located at a top of the vest 702. The front side 704 may include a light component 714 at a position near a "chest" of the host robot. The light component may be any of the light components described herein, such as an LCD display, a LED display, a grid of light pixels, and so forth. The light component may extend over a larger portion of the front side 704 and possibly along sides of the vest 702. The front side 704 may include one or more imaging device 716, such as the imaging device described above (e.g., a camera, a thermal imaging device, etc.). The front side 704 may include one or more speakers 718 and/or microphones 720. The microphones 720 may be arranged in a microphone array to determine direction of sounds.

Turning to FIG. 7B, the back side 706 of the vest 702 may include one or more light components 722 similar to the light component 714. The back side 706 may include storage receptacles 724, which may include, contain, and/or secure a battery, a communication device (e.g., antenna, radio, transceiver, receiver, etc.), computing hardware (e.g., processors/memory), a port, and/or other components of the wearable device 700.

Figure 8:
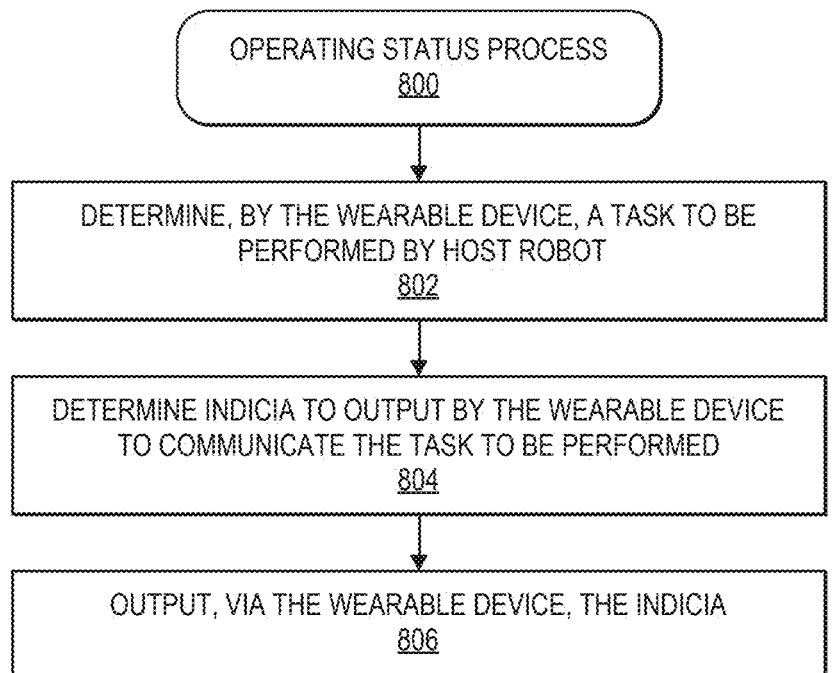
FIG. 8 is a flow diagram of an example process to determine a task performed by a host robot, in accordance with disclosed implementations.

FIG. 8 is a flow diagram of an example process 800 to determine a task performed by a host robot, in accordance with disclosed implementations. The example process of FIG. 8 and each of the other processes and sub-processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMS, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation and any number of the described operations can be combined in any order and/or in parallel to implement the routine. Likewise, one or more of the operations may be considered optional. Various operations from different processes may be combined in accordance with various embodiments.

The process 800 may begin by determining, by the wearable device, a task to be performed by the host robot, as in 802. The wearable device may determine the task to be performed in any number of ways. The wearable device may receive data about the task to be performed from the remote server. The wearable device may receive data about the task to be performed by the host robot. The wearable device may analyze movement of the host robot to determine the task to be performed. For example, the wearable device may sense movement of the host robot and determine location information to assist the host robot during the movement. The imaging device of the wearable device may capture imagery that provides information about a task to be performed. For example, the imagery captured may show the host robot near totes that are frequently used to move items, sort items, or perform other known tasks. Thus, the presence of the totes may indicate the task. As another example, the location of the host robot, determined by the wearable device possibly by fiducial marks or location attributes, may indicate the task to be performed. For example, the host robot may perform a same task when located in a certain area.

The wearable device may determine indicia to output to communicate the task to be performed, as in 804. The indicia may be output via the communication device of the wearable device as a message or data to another device, such as the remote server or another third party device. The indicia may be output via the light component included in the wearable device, thereby enabling other viewers (humans, robots, etc.) to determine the task to be performed. The indicia may be words on the display, an image, color, or other display output associated with a task, including projected displays in the environment. The indicia may be an audible sound emitted by the wearable device, which may be words, music, or other sounds associated with a task.

The wearable device may output the indicia to indicate the task, as in 806. For example, the wearable device may output data, a display, a projection, sounds, or a combination thereof as determined by the operation 804. In some embodiments, the output may be used to alert humans about what task the host robot is going to perform.

Figure 9:
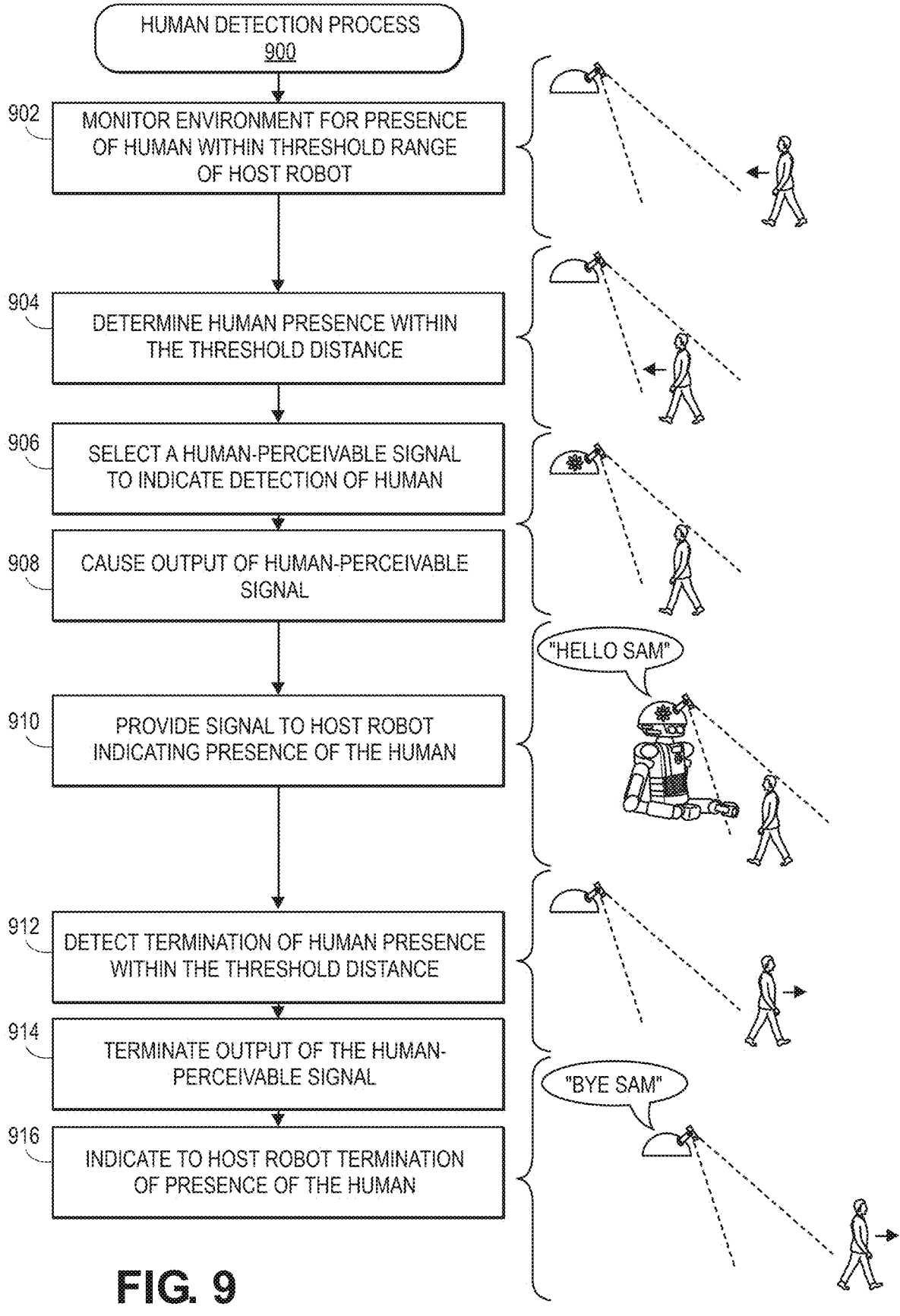
FIG. 9 is a pictorial flow diagram of an example process to detect a human near a host robot, according to an implementation.

FIG. 9 is a pictorial flow diagram of an example process 900 to detect a human near a host robot, according to an implementation. The process 900 may begin by monitoring an operating environment of the host robot to identify a presence of a human within a threshold range of the host robot, as in 902. The monitoring may be performed by capturing or monitoring radio signals received by the wearable device, capturing imagery of the operating environment by the wearable device, and/or capturing audio/sound using a microphone of the wearable device.

The wearable device may determine human presence within the threshold distance, as in 904, based on the monitoring at the operation. In some embodiments, the wearable device may include a receiver that is capable of detecting radio signals from a radio frequency (RF) badge worn by humans. The receiver may determine, upon receipt of signals from the RF badge, that a human is within the threshold distance from the host robot. In various embodiments, the wearable device may triangulate a distance from the RF badge associated with the human to determine if the human is within the threshold distance. In one or more embodiments, the wearable device may capture imagery of an operating environment and perform object recognition on the imagery to determine whether a human is within a threshold distance, such as in viewable sight of the host robot. In some embodiments, the wearable device may capture audio from a human that announces their presence to the host robot to determine that a human is within a threshold distance from the host robot. The wearable device may detect human presence within the threshold distance using any of these techniques or a combination of these techniques. A direction of the human relative to the front of the host robot and/or front side of the wearable device may be determined by triangulation of sound or radio signals or by analysis of imagery captured by the wearable device.

The wearable device may determine a human-perceivable signal to output to indicate detection of the human, as in 906. For example, the wearable device may determine to emit a sound, emit a display and/or light, send a radio signal to another device to provide an output to the human, or provide other human-perceivable outputs. The signal may be to inform the human that the wearable device has detected their presence and will take actions to ensure that the host robot operates accordingly, such as by slowing operation of the host robot or taking other actions to avoid the human or maintain a distance from the human.

The wearable device may cause output of the human-perceivable signal, as in 908. For example, the wearable device may cause a speaker to emit the sound, cause the display to emit an image and/or light (e.g., color, a display, etc.), send a radio signal, and/or take other output actions to provide the human-perceivable signal to the human.

The wearable device may provide a signal to the host robot indicating the presence of the human within the threshold distance, as in 910. For example, the wearable device may send a signal to the host robot, may emit a physical output that can be detected by the host robot (e.g., a sound, a display of light, and/or a tactile output), or may send a signal to the remote server for relay to the host robot.

The wearable device may detect a termination of the human presence within the threshold distance from the host robot, as in 912. For example, the monitoring by the wearable device (e.g., the operation 902) may indicate that the human is no longer present within the threshold range/distance from the host robot.

The wearable device may terminate the output of the signal initiated at the operation 908, as in 914. Termination of the signal from the operation 908 may include terminating a sound emitted by the wearable device, terminating a display or emission of light caused by the wearable device, and/or terminating radio signals indicating presence of the human.

The wearable device may indicate to the host robot a termination of presence of the human, as in 916. This may terminate the output of the signal initiated at the operation 910. For example, the wearable device may send a second message to the host robot and/or remote server indicating termination of the presence of the human within the threshold range from the host robot.

In some embodiments, the wearable device may capture sounds from a human and process those sounds, possibly via the remote server and/or other remove devices configured with speech-to-text and natural language understanding software to enable responding to the human. For example, the wearable device may be configured to operate as a personal assistant with hardware such as a microphone array and a speaker. The wearable device may detect a voice of a human that includes a natural language request. The wearable device may send that natural language request to a remote device for processing. The remote device may be a large language model (LLM) or may communicate with an LLM to process the request. The wearable device may receive a response from the remote device. The wearable device may announce or playback the response for the human. In this manner, a human may converse or otherwise exchange information through dialog with the wearable device, possibly to provide instructions to the wearable device, which may be relayed to the host robot, the remote server, and/or another device. Example requests from a human may include "take this box," "move to the right please," "stop," "go to the next station," and so forth.

Figure 10:
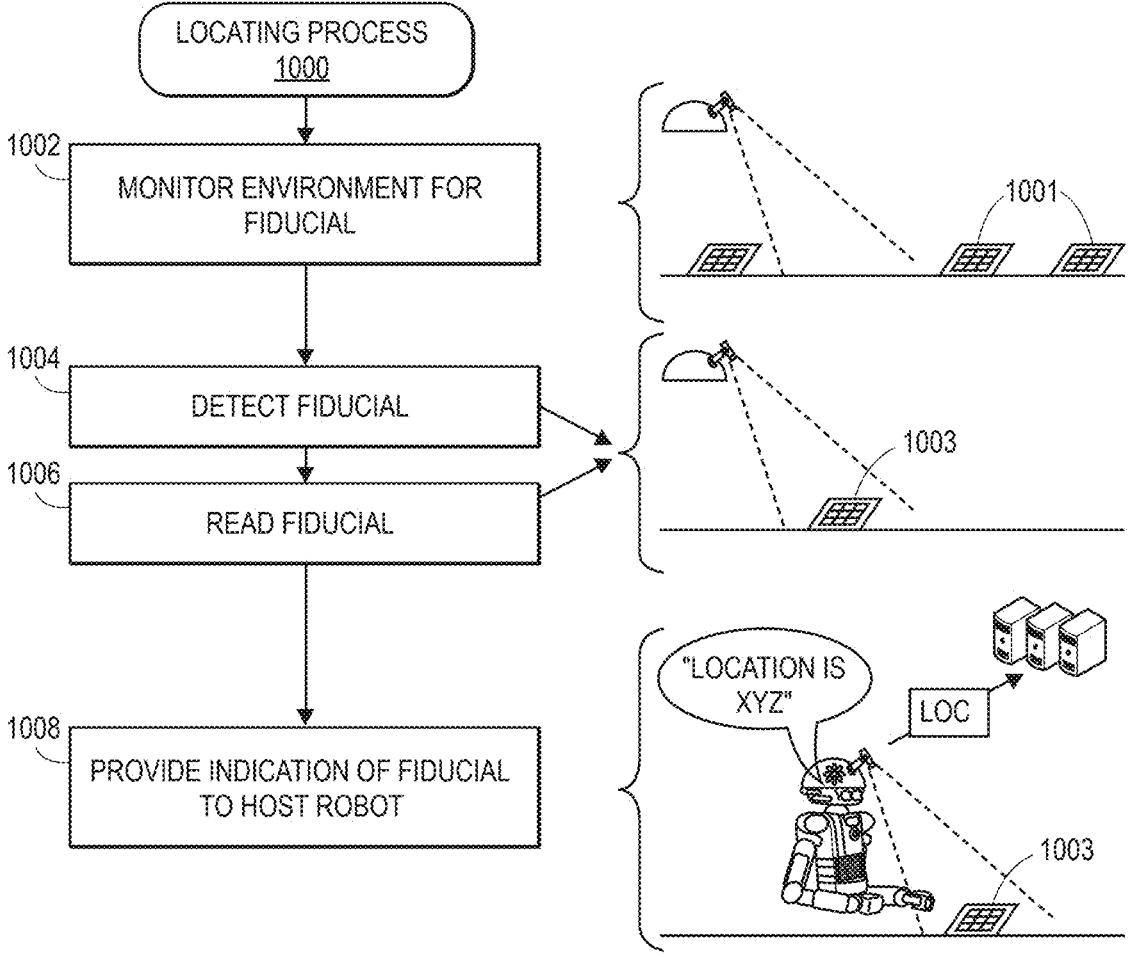
FIG. 10 is a pictorial flow diagram of an example process to determine a location of a host robot, according to an implementation.

FIG. 10 is a pictorial flow diagram of an example process 1000 to determine a location of a host robot, according to an implementation. The process 1000 may begin by monitoring the operating environment for fiducial marks 1001 that are associated with unique locations within the operating environment, as in 1002. The monitoring may be performed by the imaging device and via analysis of images captured by the imaging device to identify fiducial marks.

The wearable device may detect a fiducial mark 1003, as in 1004. For example, the wearable device may perform image analysis on imagery captured of the operating environment. More specifically, the imagery may be imagery near the feet of the host robot, where the imagery includes the fiducial mark.

The wearable device may read the fiducial mark, as in 1006. Reading the fiducial mark may involve decoding the fiducial mark, which may be an image code similar to a quick response (QR) code or other image code. In some embodiments, reading the fiducial mark may include exchanging information with another device, such as the remote server.

The wearable device may provide an indication of the fiducial mark to the host robot, as in 1008. For example, the wearable device may announce a location to the host robot via audio by the speaker, emit light indicating a location of the host robot (e.g., projecting information to the host robot and/or confirming a location to the host robot), and/or provide location data via a port, wireless data, and/or via an intermediary such as the remote server.

While the description of the process 1000 describes use of fiducial marks, other location attributes may be used to perform the same or similar operations to provide location informing data. For example, the wearable device may capture location informing data of the environment using ranging components and/or image sensors to create a 3D surface or view of an area in the environment. That 3D surface may be compared to known surfaces that are associated with known locations. For example, the surfaces captured may include unique features that may indicate a location in the environment. Unique features may include building features (e.g., windows, doors, hallways, columns, etc.), known objects (e.g., landmarks, statues, vehicles, tools, etc.), and so forth.

In addition, the wearable device may determine obstacles to avoid during movement within an environment and may provide indications of these obstacles to the host robot. For example, the wearable device may detect humans to avoid, detect changes in elevation or "cliffs" in the environment (e.g., stairs, loading dock, etc.), misplaced items in a pathway that may interfere with movement of the host robot, and so forth. The wearable device may provide indications of the obstacles to the host robot by transmission of electronic data signals, physical outputs (e.g., sound, light), and/or via the remote server.

Figure 11:
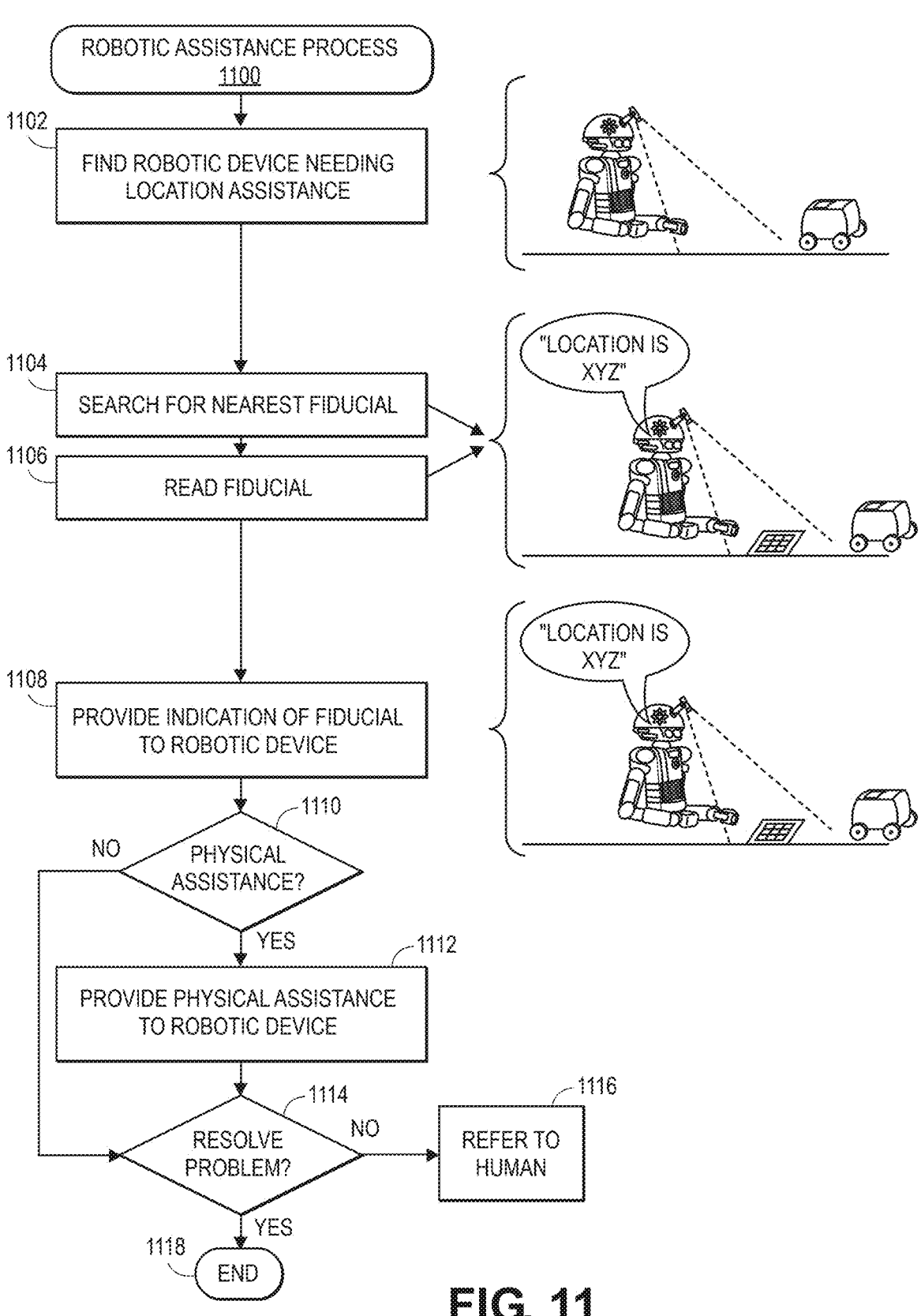
FIG. 11 is a pictorial flow diagram of an example process to assist another robot, according to an implementation.

FIG. 11 is a pictorial flow diagram of an example process 1100 to assist another robot, according to an implementation. For example, the host robot may locate another robot that needs assistance identifying location information to proceed with a task. Some robots may pause or otherwise terminate operation when they are unable to identify their location and are thus "lost." The process may begin by finding a robot needing location assistance, as in 1102. The host robot may travel to a last known location of the robot needing assistance. The wearable device may capture imagery and/or detect radio signals or audible signals to locate the robot needing assistance.

The wearable device may search for a nearest fiducial mark to the robot needing assistance, as in 1104. The wearable device may capture imagery of the operating environment that includes the robot needing assistance and includes locations where fiducial marks may be present. Analysis of the imagery, by the wearable device or by the remote server, may reveal a fiducial mark near or proximate to the robot needing assistance.

The fiducial mark may be read, as in 1106. The wearable device may decode the fiducial mark or send an image of the fiducial mark to the remote server for decoding. In the latter case, the wearable device may receive the decoded location from the remote server.

The wearable device may provide an indication of the location of the fiducial mark to the robot needing assistance, as in 1108. For example, the wearable device may announce the location associated with the decoded fiducial mark, cause a display indicating the location associated with the decoded fiducial mark, or transmit data to the robot needing assistance to provide the location associated with the decoded fiducial mark. In various embodiments, the remote server may send the location associated with the decoded fiducial mark to the robot needing assistance. In some embodiments, the wearable device may emit light on the fiducial mark to indicate the location of the fiducial mark to the host robot and robot needing assistance.

The wearable device may determine whether the robot needing assistance requires physical assistance, as in 1110. For example, the robot may be stuck or may have an object blocking a sensor of the robot. The wearable device may determine the need for physical assistance based on imagery captured by the wearable device that includes the robot needing assistance, based on an output from the robot (e.g., a light, sound, or radio signal, etc.), and/or from information received from the remote server.

If the wearable device determines that physical assistance is needed, following the "yes" route from the decision operation 1110, then processing may continue at an operation 1112. The wearable device may instruct the host robot to provide physical assistance to the robot in need of assistance, as in 1112. For example, the wearable device may emit instructions via a display of light, sound, radio signals, or via a port coupled to the host robot to cause the host robot to provide physical assistance to the robot in need of assistance. The physical assistance may be to move the robot, move an object near the robot, or provide other physical assistance such as illuminate or otherwise locate the fiducial mark that is closest to the robot in need of assistance.

When no physical assistance is needed or following the operation 1112, the process 1100 may advance to a decision operation 1114. The wearable device may determine whether the problem has been resolved, as in 1114. For example, the wearable device may detect that the robot has not moved or continues to request help via detection of radio signals, light, and/or sound from the robot needing assistance or from data from the remote server. When the problem has not been resolved, following the "no" route from the decision operation 1114, then the process 1100 may advance to an operation 1116 and may request help from a human. For example, the wearable device may send a signal to request human intervention to assist the robot in need of assistance. When the problem is resolved, following the "yes" route from the decision operation 1116, then the process 1100 may end, as in 1118.

In some embodiments, the wearable device may be configured to enable remote assistance by a human operator, such as tele-operation. For example, the wearable device may provide information, such as a live camera feed to the remote server that is selectively viewable by a human operator. The human operator may provide control information to the host robot and/or output information to the wearable device to assist in control of the wearable device and/or the host robot. For example, in the operation 1110 discussed above, the human operator may determine whether to provide physical assistance to the other robot based on imagery of the other robot. In some embodiments, the human operator may provide a command to the wearable device, such as to cause the wearable device to output information to instruct the host robot to perform an action. The wearable device may project light on the environment under direction of the human operation, emit sound caused by the human operator, and/or provide other outputs in response to actions and/or inputs from the human operator. In this way, the wearable device may be assisted by a human from time to time via a tele-operation or other remote assistance. In some embodiments, the inputs from the human operator could be used to train the wearable device over time to perform actions without assistance by the human. For example, data captured during human assistance may be annotated as learning data to train the wearable device and/or the host robot over time.

Figure 12:
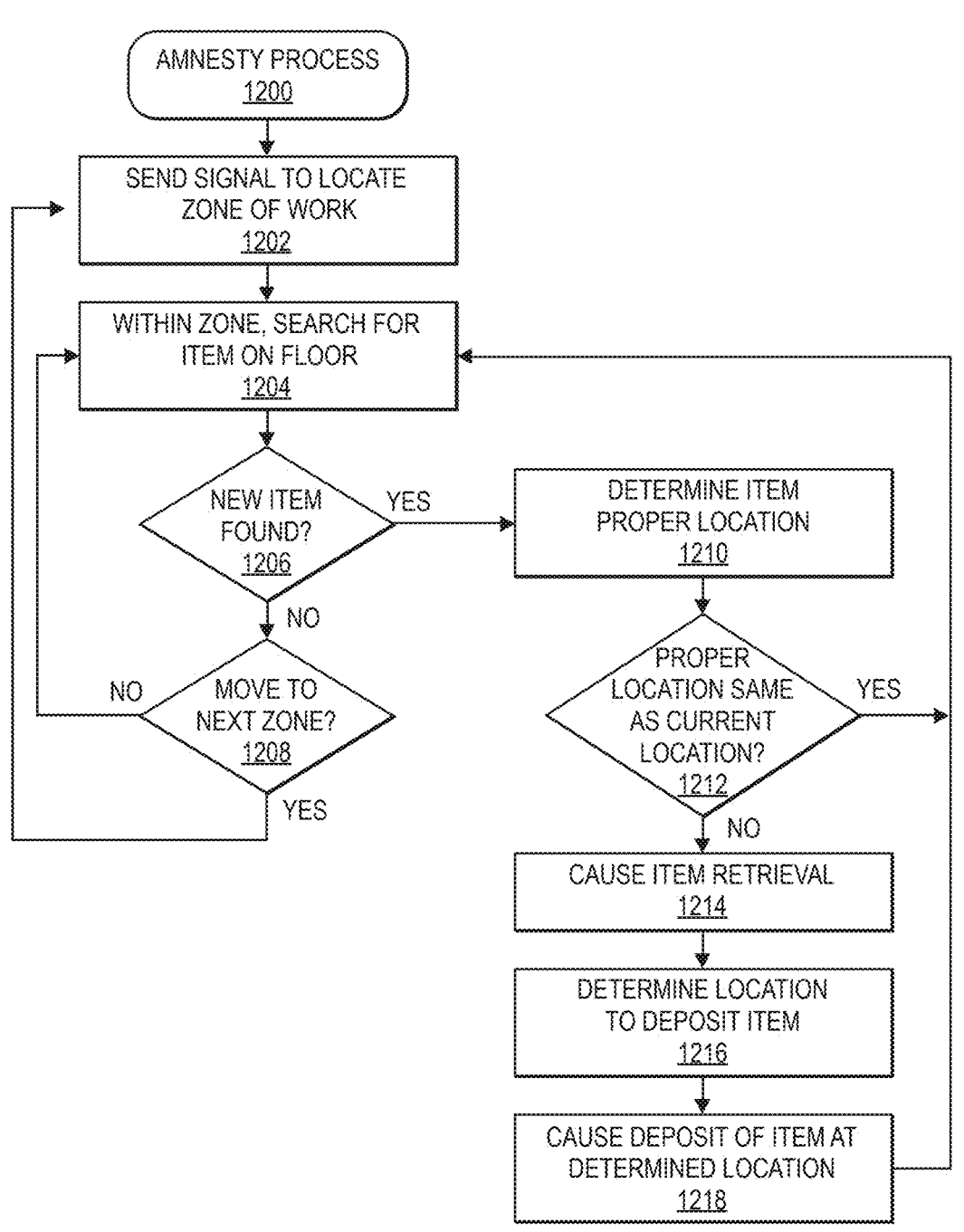
FIG. 12 is a flow diagram of an example process to locate misplaced items, according to an implementation.

FIG. 12 is a flow diagram of an example process 1200 to locate misplaced items, according to an implementation. The process 1200 may begin by the wearable device sending a signal indicating a zone of work to detect misplaced items, as in 1202. For example, the wearable device may send a signal to the host robot to cause the host robot to move about the zone of work. In some embodiments, the wearable device may send the signal to the remote server to relay the signal to the host robot, thus causing the host robot to move about the zone.

Within the zone, the wearable device may search for items on the floor or at other locations in the operating environment, as in 1204. The wearable device may capture imagery of the zone, such as the floor and/or other areas and may use object recognition software to analyze the imagery to detect items.

The wearable device may determine whether an item is found in the imagery, as in 1206. The item may then be analyzed to determine whether the item is misplaced. When no item is found, the process may advance, via the "no" route from the decision operation 1206, to a decision operation 1208.

The wearable device may determine whether to move to a next zone in the operating environment to search for misplaced items. When the wearable device determines to move to the next zone, following the "yes" route from the decision operation 1208, then processing may continue at the operation 1202. For example, the wearable device may move to another zone after an elapse of time, after a search path is complete, after failing to find a misplaced item for a threshold amount of time, and/or for other reasons. When the wearable device determines to not move to the next zone, following the "no" route from the decision operation 1208, then processing may continue at the operation 1204.

Returning to the decision operation 1206, when an item is found, the process may advance, via the "yes" route from the decision operation 1206, to an operation 1210. The wearable device may determine a proper location associated with the item found at the decision operation 1206. For example, the item may be a bag of rice found on the floor. The rice may normally be stored on a shelf in a nearby location. The bag of rice may inadvertently land on the floor due to a mistake or error by a robot or human. The wearable device may identify the proper location of the item such as by identifying the item and identifying an associated location for the item, such as using a lookup table or other reference.

The wearable device may determine whether the proper location of the item is the same as the current location of the item, as in 1212. In the example above, the bag of rice has a current location on the floor of the zone while the proper location is on an adjacent shelf. Thus, the bag of rice is misplaced. However, some items may be determined to have a current location as a proper location, such as when the wearable device identifies a doorstop located on the floor next to a door. When the proper location is the same as the current location, following the "yes" route from the decision operation 1212, then the process 1200 may return to the operation 1204 and continue searching. When the proper location is not the same as the current location, following the "no" route from the decision operation 1212, then the process 1200 may advance to an operation 1214.

The wearable device may cause the item to be retrieved by the host robot, as in 1214. For example, the wearable device may provide instructions to the host robot to retrieve the item, possibly via an audible signal, a visual signal (e.g., light emitted on the item, etc.), a radio signal to the host robot, and/or via the remote server as an intermediary.

The wearable device may determine a location to deposit the item retrieved at the operation 1214, as in 1216. The location to deposit the item may be the proper location associated with the item, such as the adjacent shelf for the bag of rice, or may be a generic location, such as a receptacle for misplaced items, a recycling bin, a trash bin, a sorting location, and/or other locations.

The wearable device may cause the host robot to deposit the item at the determined location, as in 1218. For example, the wearable device may provide instructions to the host robot to deposit the item at the determined location, possibly via an audible signal, a visual signal (e.g., light emitted on the item, etc.), a radio signal to the host robot, and/or via the remote server as an intermediary.

Figure 13:
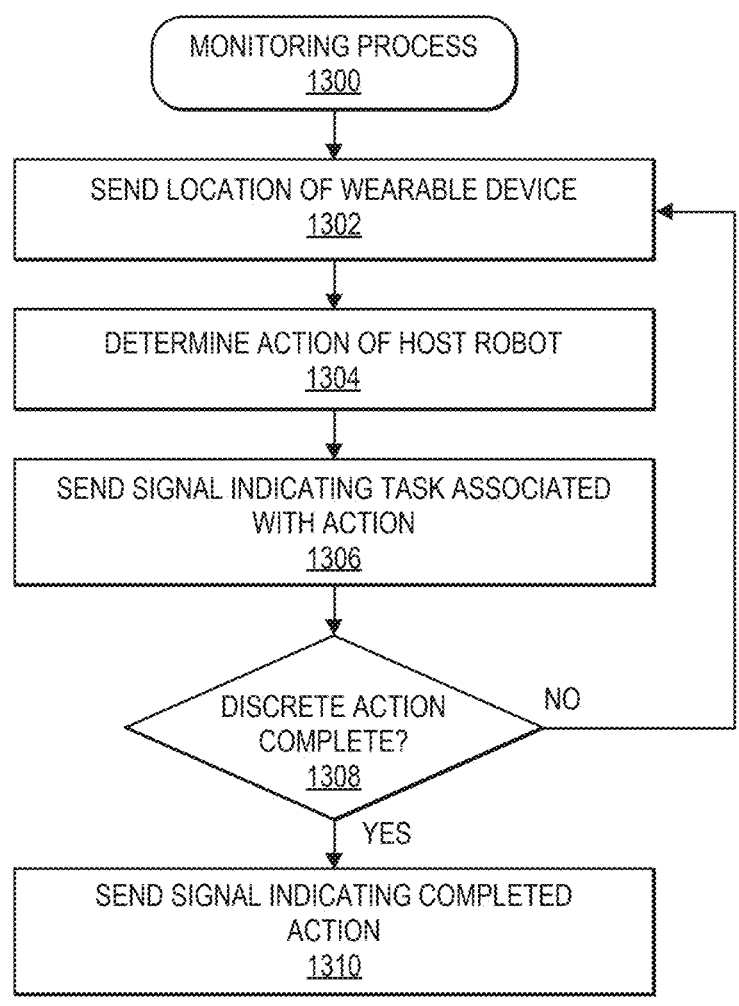
FIG. 13 is a flow diagram of an example process to monitor activity of a host robot, according to an implementation.

FIG. 13 is a flow diagram of an example process 1300 to monitor activity of a host robot, according to an implementation. The process 1300 may be used to create a log of actions of the host robot, which may be used to analyze actions of the host robot, among other possible uses. The process 1300 may begin by sending, from the wearable device, a location of the wearable device that corresponds to a location of the host robot, as in 1302. Since the wearable device may be coupled to (or worn by) the host robot, the location of the wearable device corresponds to the location of the host robot. The location may be determined based on detection of fiducial marks, triangulation of radio signals, global positioning system (GPS) data, or other known techniques to determine location.

The wearable device may determine an action being performed by the host robot, as in 1304. The action may be a movement component or part of a task. For example, a task may include moving a tote from a first location to a second location. The actions included in that task may include picking up the tote in the first location, transporting the tote to the second location, and depositing the tote at the second location, among other possible actions. The wearable device may determine the action being performed by the host robot in any number of ways, such as through data transmission, location data, and/or observational data. The wearable device may receive data about the action being performed from the remote server. The wearable device may receive data about the action being performed by the host robot. The wearable device may analyze movement of the host robot to determine the action being performed (e.g., walking, grasping object, etc.). In some embodiments, the imaging device of the wearable device may capture imagery that provides information about an action being performed. For example, the imagery captured may show the host robot holding a tote that is used to move items and thus may determine the action from analysis of this imagery. Thus, the presence of the tote held by the host robot may indicate the action. As another example, the location of the host robot, determined by the wearable device possibly by fiducial marks, may indicate the action being performed. The host robot may perform a same action when located in a certain area, such as sorting items at a sorting location.

The wearable device may send a signal indicating the task being performed that is associated with the action, as in 1306. For example, the action determined at the operation 1304 may be part of a task assigned to the host robot that includes multiple actions to complete. The task may be determined in a similar manner as determination of the action as discussed with respect to the operation 1304. In some embodiments, the task may be determined based on a sequence of determined actions that are associated with a known task. For example, if the actions determined from the operation 1304 include action A, action B, and action C, and that sequence of actions is unique to a certain task, then the wearable device may determine the task by this association.

The wearable device may determine if the task and/or action are complete, as in 1308. The task may be determined as complete after completion of a last action included in the task. In the example of moving the tote from a first location to a second location, the task may be determined to be complete upon completion of a last action of depositing the tote at the second location. When the task is determined to not be complete, following the "no" route from the decision operation 1308, processing may return to the operation 1302. When the task is determined to be complete, following the "yes" route from the decision operation 1308, processing may advance to an operation 310.

The wearable device may send a signal indicating completion of the action and/or task, as in 1310. For example, the wearable device may send a signal to the remote server or another third-party device to indicate completion of tasks and/or actions. The signal may include location information associated with each of the tasks and/or actions. In some embodiments, the location information may be associated with a start and/or end of the particular action and/or task. The location information may be provided from time to time without necessarily being initiated by actions or tasks. For example, the location information may be provided by the wearable device in certain time intervals, randomly, or using other times.

Figure 14:
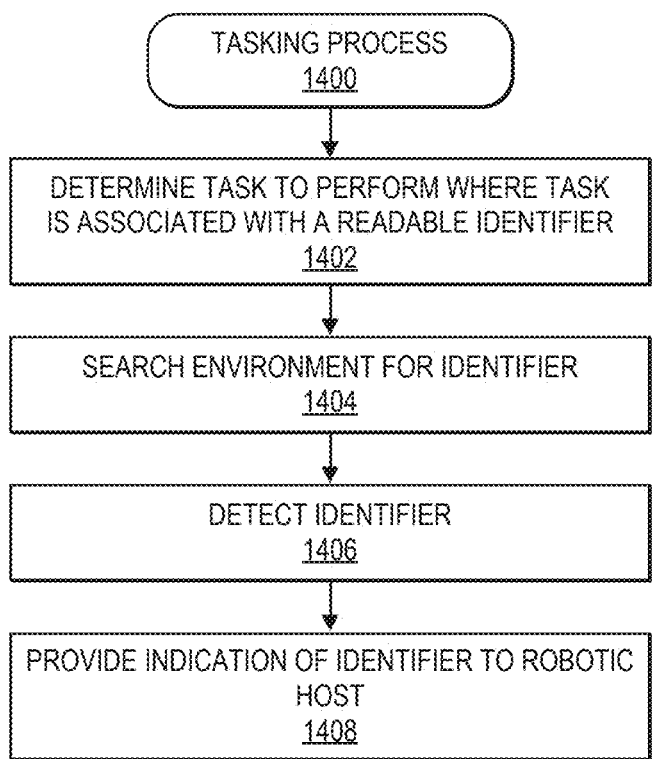
FIG. 14 is a flow diagram of an example process to provide task information to a host robot, according to an implementation.

FIG. 14 is a flow diagram of an example process 1400 to provide task information to a host robot, according to an implementation. The process 1400 may enable the wearable device to provide information to the host robot to complete a task, such as by providing information that the wearable device is capable of collecting or dispensing and when the information is not readily available to the host robot. For example, the wearable device may include sensors optimized for certain actions and may perform those actions to assist the host robot in performing a task. As an example, the task may be to place certain items in a tote. The wearable device may detect the proper items to place in the tote and may indicate those items to the host robot, such as by projecting light on those items, among other possible ways to indicate the proper items.

The process 1400 may begin by determining, by the wearable device, a task to be performed that requires the wearable device to read identifiers of objects, as in 1402. The wearable device may read the identifiers using a vision system (e.g., object recognition, scanning an image code, etc.) and/or using a radio system such as radio frequence identifiers (RFID). The identifiers may be codes, text, packaging, or other identifiers that differentiate items. In some instances, the identifiers may be colors, patterns, or designs.

The wearable device may search an area proximate to the host robot in the operating environment for an identifier, as in 1404. For example, the host robot may be located near a sorting station that includes a plurality of items to be sorted into a tote. The wearable device may detect identifiers associated with the items using a vision system, a radio system, or other detection techniques. The wearable device may detect a first item as being a certain product having a product code or identifier, such as a box of cereal. The wearable device may determine that the box of cereal is to be added to the tote. For example, the wearable device may receive a packing list for the tote from the remote server. The wearable device may search for items located at the sorting station and included in the packing list.

The wearable device may provide an indication of the identifier to the robotic host to allow the host robot to perform or complete a task, as in 1408. In the example above, the wearable device may identify that the box of cereal is to be added to the tote because the box of cereal is included in the packing list. The wearable device may indicate to the host robot to add the box of cereal to the tote. The wearable device may provide the indication to the host robot using projected light, such as by emitting light (e.g., a laser point, a projected display of light, etc.) onto the box of cereal, which can be detected by the host robot as the item to grasp and place in the tote. As another example, the wearable device may provide data or audible instructions to the host robot to locate the box of cereal or other item to be added to the tote. For example, the wearable device may provide audible instructions such as "add the box of cereal located at 2 o'clock or at position [x,y]. The wearable device may provide tactile feedback to the host robot when an action of the host robot is correct or incorrect. For example, when the host robot grasps the wrong item, the wearable device may vibrate to indicate that the host robot has selected the wrong item. The wearable device may provide feedback to the host robot when an action of the host robot is correct or incorrect. For example, when the host robot grasps the wrong item, the wearable device may cause emission of a certain sound and/or light to indicate that the host robot has selected the wrong item. The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Moreover, with respect to the one or more methods or processes of the present disclosure shown or described herein, including but not limited to the flow charts shown in FIGS. 8-14, orders in which such methods or processes are presented are not intended to be construed as any limitation on the claimed inventions, and any number of the method or process steps or boxes described herein can be combined in any order, in parallel, and/or be omitted to implement the methods or processes described herein. Also, the drawings herein are not drawn to scale.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media.

Disjunctive language such as the phrase "at least one of X, Y, or Z," or "at least one of X, Y and Z," unless specifically stated otherwise, is otherwise understood with the context as used in general to present that an item, term, etc., may be any of X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" or "a device operable to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly," or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Although the invention has been described and illustrated with respect to illustrative implementations thereof, the foregoing and various other additions and omissions may be made therein and thereto without departing from the spirit and scope of the present disclosure.

What is claimed is:

1. A wearable device configured to secure to a host robot, the wearable device comprising:

a frame to couple to the host robot;

a battery coupled to the frame;

at least one imaging device coupled to the battery and the frame;

a transceiver coupled to the battery and the frame;

a light component coupled to the battery and the frame;

one or more processors coupled to the battery and the frame, the one or more processors in communication with at least the at least one camera, the transceiver, and the light component; and a memory coupled to the frame and the one or more processors, the memory storing program instructions that, when executed by the one or more processors, cause the one or more processors to at least:

capture, by the at least one camera, image data including at least a floor that includes a plurality of fiducial marks, each fiducial mark indicating a unique location within an operating environment;

analyze the image data to determine first data to send to a remote server based at least in part on detection of one of the plurality of fiducial marks, the first data to inform control of the host robot;

transmit, using the transceiver, at least the first data to the remote server;

analyze the image data to determine second data associated with detection of a known object; and cause the light component to output a display of light based at least in part on the second data being associated with the known object, the display of light providing an indication of a presence of the known object.

2. The wearable device of claim 1, wherein:

the frame includes at least a first component that is shaped as a substantially circular dome configured to couple to the host robot above the body of the host robot; and the at least one camera includes a plurality of cameras positioned around a perimeter of the substantially circular dome to capture overlapping imagery of the operating environment.

3. The wearable device of claim 1, wherein:

the transceiver is configured to detect presence of a human wearing a radio frequency (RF) badge within a threshold range of the host robot, the transceiver to receive at least an identifier of the human from the RF badge; and the memory further stores program instructions that, when executed by the one or more processors, cause the one or more processors to at least:

transmit to the remote server, using the transceiver, data indicating detection of the human within the threshold distance from the host robot based at least in part on receipt of the identifier; and cause the light component to emit the display of light indicating the detection of the human within the threshold distance from the host robot based at least in part on receipt of the identifier.

4. The wearable device of claim 1, further comprising:

determine based at least in part on the second data that the known object is misplaced from a proper location associated with the known object; and transmit a signal to the remote server to initiate retrieval by the host robot of the known object.

5. A wearable device configured to secure to a host robot, the wearable device comprising:

a frame to removably couple to the host robot;

a battery coupled to the frame;

an imaging device coupled to the battery and the frame;

a transceiver coupled to the battery and the frame;

one or more processors coupled to the battery and the frame, the one or more processors in communication with at least the imaging device and the transceiver; and a memory coupled to the frame and the one or more processors, the memory storing program instructions that, when executed by the one or more processors, cause the one or more processors to at least:

capture, by the imaging device, image data within an operating environment;

analyze the image data to determine location informing data to send to a remote server based at least in part on detection of location attributes, the location informing data to inform control of the host robot; and transmit, using the transceiver, at least the location informing data to the remote server.

6. The wearable device of claim 5, further comprising:

an actuator coupled to the battery, the frame, and the imaging device, the actuator to move the imaging device relative to the frame to change a field of view of the imaging device in response to one or more signals from the one or more processors.

7. The wearable device of claim 5, wherein the frame includes:

a first component that is substantially shaped to simulate a head of the host robot, the first component removably coupled above a body of the host robot, the first component including at least the imaging device; and a second component removably coupled to the body of the host robot and including at least the battery, the second component including at least one connection to the first component.

8. The wearable device of claim 5, wherein the frame is configured to removably couple to a body of the host robot to simulate a vest.

9. The wearable device of claim 5, further comprising:

a light component coupled to the battery, the frame, and the one or more processors; and wherein:

the transceiver is configured to detect presence of a human wearing a radio frequency (RF) badge within a threshold range of the host robot, the transceiver to receive at least an identifier of the human from the RF badge; and the memory further stores program instructions that, when executed by the one or more processors, cause the one or more processors to at least:

transmit to the remote server, using the transceiver, data indicating detection of the human within the threshold distance from the host robot based at least in part on receipt of the identifier; or cause the light component to emit a display of light indicating the detection of the human within the threshold distance from the host robot based at least in part on receipt of the identifier.

10. The wearable device of claim 5, further comprising:

a light projector coupled to the battery, the frame, and the one or more processors, the light projector to project light on a surface in the operating environment; and wherein the memory further stores program instructions that, when executed by the one or more processors, cause the one or more processors to at least:

cause the light projector to project light on the surface of the operating environment to indicate at least one of a known object or location information.

11. The wearable device of claim 5, further comprising:

a microphone coupled to the frame and the one or more processors;

a speaker coupled to the frame and the one or more processors; and wherein the memory further stores program instructions that, when executed by the one or more processors, cause the one or more processors to at least:

capture, using the microphone, sound emitted within the operating environment;

analyze the sound to determine at least that the sound is from a human; and cause the speaker to emit a reply sound indicating detection of the human.

12. The wearable device of claim 5, wherein the memory further stores program instructions that, when executed by the one or more processors, cause the one or more processors to at least:

analyze the image data to determine object data associated with detection of a known object;

determine based at least in part on the object data that the known object is misplaced from a storage location associated with the known object; and output a message to initiate retrieval of the known object.

13. The wearable device of claim 5, wherein the memory further stores program instructions that, when executed by the one or more processors, cause the one or more processors to at least:

determine based at least in part on the second data that the known object is a robot requesting assistance; and perform at least one of:

send the first data to the robot or the remote server in association with the robot requesting assistance; or capture imagery of the robot requesting assistance for distribution to the remote server.

14. A wearable apparatus, comprising:

a frame to couple to a host robot, the frame including a first component to secure the frame to the host robot and a second component to uncouple the frame from the host robot;

a battery coupled to the frame;

a ranging device coupled to the battery and the frame;

a speaker coupled to the frame;

one or more processors coupled to the battery and the frame, the one or more processors in communication with at least the transceiver and the speaker; and a memory coupled to the frame and the one or more processors, the memory storing program instructions that, when executed by the one or more processors, cause the one or more processors to at least:

detect, using the ranging device, a human within a threshold range of the host robot in an operating environment; and output at least one of:

a first signal to the host robot to indicate a detection of the human within the threshold range of the host robot;

a second signal to a remote server to indicate the detection of the human within the threshold range of the host robot; or a sound, using the speaker, to communicate the detection to at least the human.

15. The wearable apparatus of claim 14, wherein:

the ranging device is an imaging device; and the memory further stores program instructions that, when executed by the one or more processors, cause the one or more processors to at least:

capture, by the imaging device, image data within the operating environment;

analyze the image data to determine location informing data to send to the remote server based at least in part on detection of location attributes, the location informing data to inform control of the host robot; and transmit, using the transceiver, at least the location informing data to the remote server.

16. The wearable apparatus of claim 14, wherein:

the ranging device is an imaging device; and the memory further stores program instructions that, when executed by the one or more processors, cause the one or more processors to at least:

capture, by the imaging device, image data within the operating environment;

analyze the image data to determine object data associated with detection of a known object;

determine based at least in part on the object data that the known object is misplaced from a storage location associated with the known object; and output a message to initiate retrieval of the known object.

17. The wearable apparatus of claim 14, further comprising:

a light component coupled to the frame, the battery, and the one or more processors; and wherein the memory further stores program instructions that, when executed by the one or more processors, cause the one or more processors to at least:

receive, using the transceiver and from the remote server, a task to be performed by the host robot; and cause the light component to output a display of light indicating the task to be performed by the host robot.

18. The wearable apparatus of claim 14, wherein the frame includes at least:

a first component removably coupled to a head of the host robot, the first component including at least the speaker; and a second component removably coupled to the body of the host robot and including at least the battery, the second component connected to the first component.

19. The wearable apparatus of claim 14, further comprising:

a data port to physically connect to a complementary data port included in the host robot, the data port to provide exchange of electronic data between the wearable device and the host robot.

20. The wearable apparatus of claim 14, wherein the memory further stores program instructions that, when executed by the one or more processors, cause the one or more processors to at least:

cause the speaker to emit sound that provides a control signal for the host robot, the control signal to cause the host robot to modify or terminate an operation being performed by the host robot.

\*   \*   \*   \*   \*